Sept. 7, 1965  A. ABOLINS  3,205,001
CONTINUOUS, SELF-LOCKING MEANS AND METHOD OF ATTACHING
ROOF SHEET TO SIDES OF VEHICLE BODY
Filed June 9, 1964  2 Sheets-Sheet 1
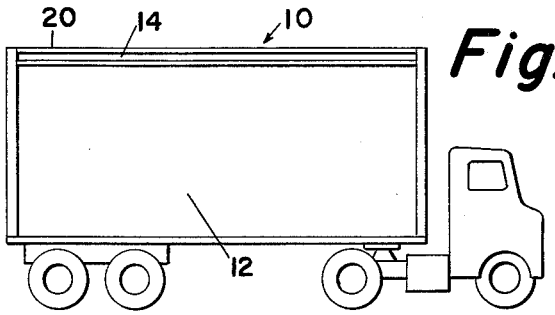
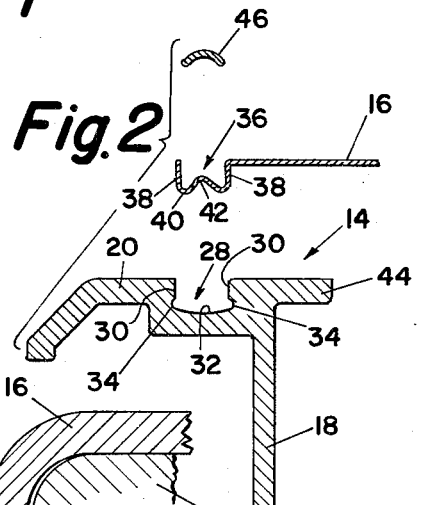
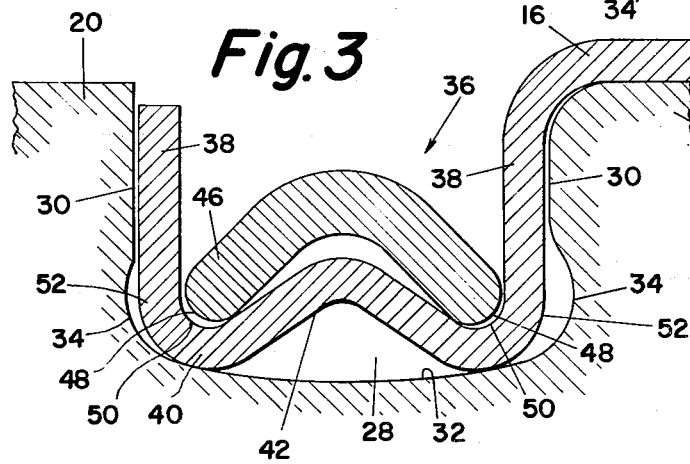
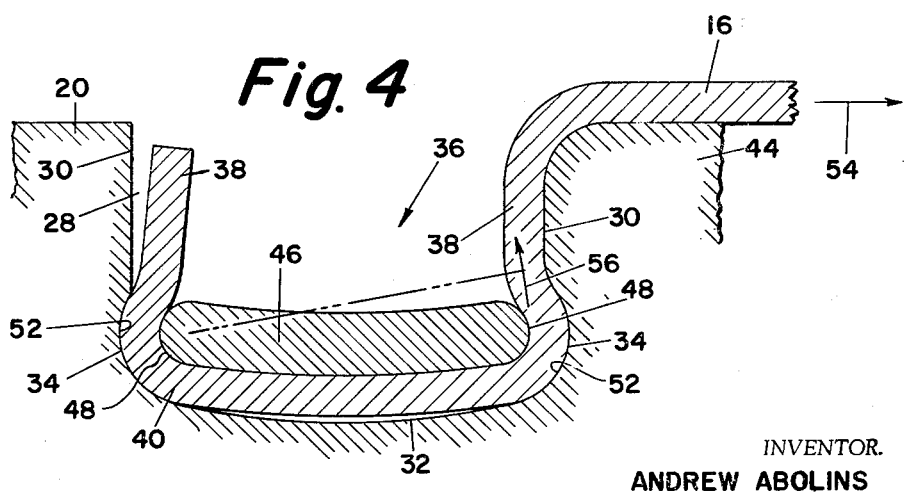
INVENTOR.
ANDREW ABOLINS
BY
Millman and Jacobs
ATTORNEYS

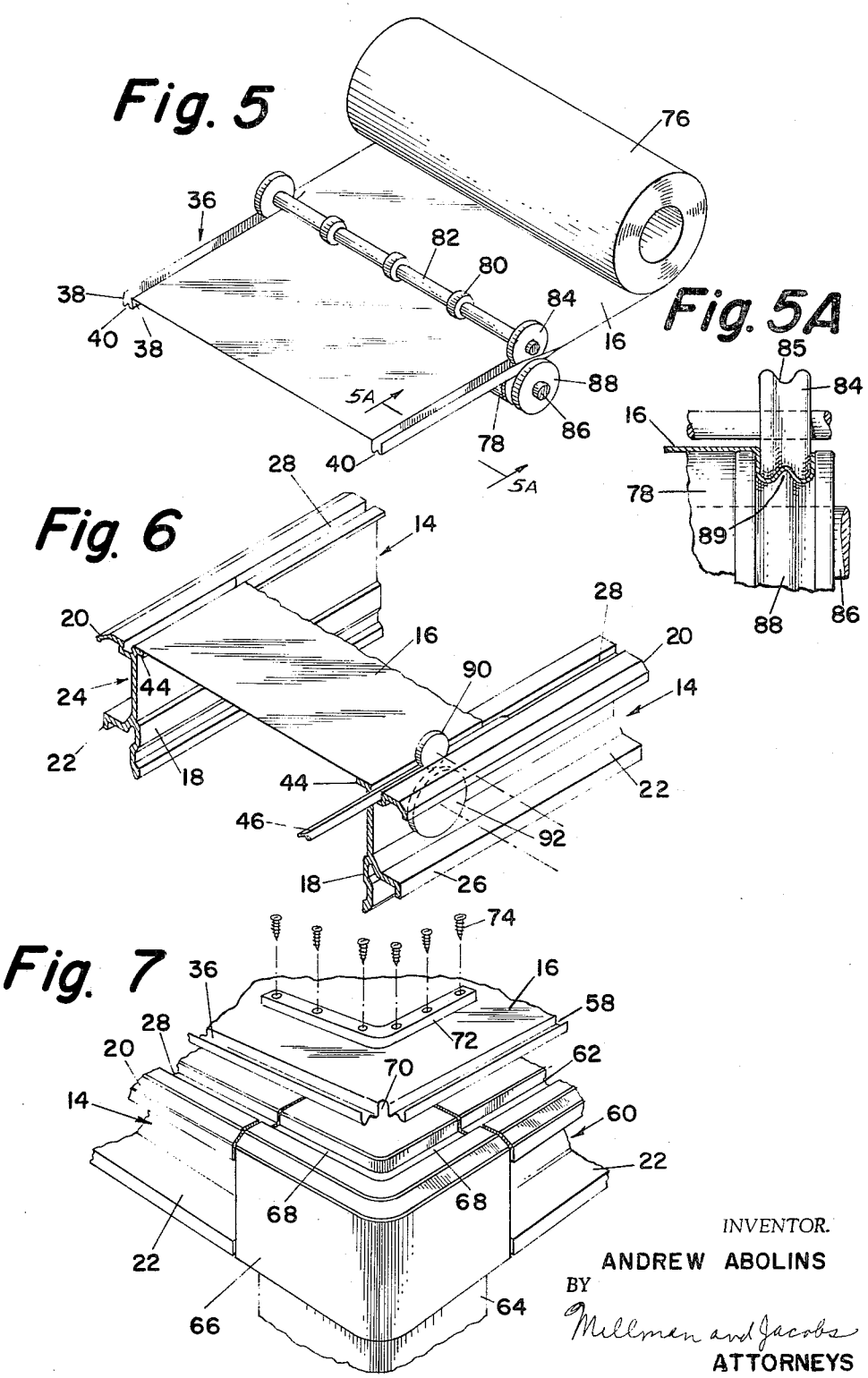

3,205,001
Patented Sept. 7, 1965

3,205,001
CONTINUOUS, SELF-LOCKING MEANS AND METHOD OF ATTACHING ROOF SHEET TO SIDES OF VEHICLE BODY
Andrew Abolins, Penndel, Pa., assignor to Strick Trailers, a division of Fruehauf Corporation, Fairless Hills, Pa., a corporation of Michigan
Filed June 9, 1964, Ser. No. 373,770
5 Claims. (Cl. 296—100)

This invention relates to a vehicle body, such as a trailer, and more particularly to a means joining the roof sheet to the top of the sides of the vehicle.

Most roof sheets are secured to the upper ends of the side walls of trailers by rivets. The rivet locations, being points of stress concentration, are starting points for roof failure.

It is the primary object of the invention to provide a continuous self-locking joint between the upper ends of the side walls of the roof sheet thereby eliminating the aforementioned disadvantage of using rivet connections.

Another object of the invention is to provide a rivetless means of attaching a one-piece roof sheet to the upper ends of the side walls of a vehicle which employs longitudinally grooved top rails mounted on said side walls, longitudinal indentations or grooves in the roof sheet spaced conformably to that of the rail grooves and received therein and a longitudinal strip of ductile or deformable metal in each roof sheet indentation urging the latter into a locked position in the rail groove thereby providing a joint of tensile strength approximating that of the roof sheet itself.

Another object of the invention is to provide a roof sheet seam or joint of the character described in which the ductile or deformable metal strip is overstraightened to a downwardly convex position to effect the locking action. Thus, when a force across the roof sheet is applied tending to pull it out of the rail groove, the pull is resisted and the locking action becomes more secure.

Another object of the invention is to provide a roof sheet seam or joint of the character described which can readily be formed with a paste type sealer in the rail groove thereby serving the dual function of a fastener and a sealer.

Another object of the invention is to provide a method of attaching a roof sheet to the upper ends of the side walls of a vehicle, continuously, in such a manner as to require simple manipulations and relatively simple swaging and rolling tools thereby effecting substantial economies in time and labor. Moreover, the attachment can be effected upon a vehicle body whose side walls do not require temporary roof bows to hold them in place during the attachment procedure.

Another object of the invention is to provide a roof sheet seam or joint as above described in which more secure locking action resisting the pulling out of the roof sheet results from the provision of a generally U-shaped rail groove with a concave bottom, a generally U-shaped roof sheet indentation with a gathered bottom, and a ductible or deformable metal strip in the roof sheet indentation acting to spread the gathered bottom of the roof sheet indentation and urge it outwardly and against the sides and bottom of the rail groove when the ductile or deformable metal strip is overstraightened to the concave position of the bottom of the rail groove.

These and other objects of the invention will become more apparent as the following description proceeds in conjunction with the accompanying drawings, wherein:

FIG. 1 is a side elevational view of a trailer embodying the invention;

FIG. 2 is a group vertical sectional view through the three main parts making up the roof joint;

FIG. 3 is an enlarged vertical sectional view through the three main parts, i.e. the locking strip, roof sheet, and trailer top rail, with the roof sheet and locking strip in the top rail prior to locking;

FIG. 4 is a view similar to FIG. 3 showing the roof sheet locked in the top rail;

FIG. 5 is a perspective view of the roof sheet and a means to make the longitudinal indentations therein;

FIG. 5A is a sectional view taken on the line 5A—5A of FIG. 5;

FIG. 6 is a perspective view showing the insertion of the roof sheet indentations and locking strip in the top rail groove and a means to overstraighten the strip and effect the locking action; and FIG. 7 is a perspective view of a means to finish off the corner of the trailer body.

Specific reference is now made to the drawings wherein similar reference characters are used for corresponding elements throughout.

Indicated generally at 10 is a vehicle, such as a trailer, whose body is constructed, among other things, of laterally spaced, longitudinally extending side walls 12 upon the upper edges of which are appropriately mounted top rails 14 which extend along the entire length of the upper edges of the side walls and which serve to finish off the side construction and as a means to effect attachment of the roof sheet 16, the latter being a deformable sheet of metal, such as aluminum, of desired gage.

The top rail is preferably an F-shaped member, see FIG. 6, having a vertical arm 18 and a pair of spaced horizontal flanges 20 and 22 forming a side opening groove 24 for the mounting of clearance lights, etc. The lower flange 22 has a vertical downwardly extending lip 26 forming between it and the lower part of the arm 18 a groove to receive the upper edge of the side wall 12 upon which it is mounted and to which the lower part of the arm 18 is secured by appropriate rivets and like fasteners.

The upper horizontal flange 20 is provided with a longitudinal top-opening groove 28 along its full length, the groove being generally U-shaped in vertical cross section and including a pair of laterally spaced, generally parallel side portions or walls 30 joined by web or bottom portion 32 which is concave relative to the top open end of the groove. Where the side portions or walls 30 are joined by the web 32, longitudinal corners 34 are formed which extend laterally outwardly of the planes of the side portions 30, as clearly seen in FIGS. 2–4.

The roof sheet spans the top rails 14 and includes top-opening indentations or grooves 36 longitudinally along the sides of the roof sheet, each indentation being also generally U-shaped in vertical cross section and including laterally spaced generally parallel side portions or walls 38 jointed by a web or bottom 40 which is provided with an upwardly convex gather or crimp 42.

The roof sheet is positioned across and lengthwise of the side walls 12 and the indentations 36 are inserted in corresponding grooves 28 of the top rails. It will be seen from FIG. 3 that the lateral space between the outer surfaces of the side portions 38 of the roof sheet indentation 36 is slightly less than the lateral space between the side portions 30 of the rail groove 28 and that the depth of the indentation 36 is slightly less than but approximates that of the rail groove 28 so that when the peak portions of the crimped web 40 of the indentation 36 contacts the concave bottom 32 of the rail groove, the upper edge of the outer side portion 38 of the roof sheet indentation 36 is slightly below the upper edge of the upper flange 20 of the top rail. It will further be seen that the upper flange 20 of the top rail 14 also includes a horizontal portion 44, see FIGS. 2–4, which extends inwardly from the vertical arm 18 of the rail and serves as a ledge over which the roof sheet extends as its indentations 36 enter the rail grooves 28.

A longitudinal strip 46, preferably the full length of the rail groove, is provided which is made of ductile or deformable metal and is inserted into each indentation 36 of the roof sheet when said indentation is in turn inserted in the rail groove 28, as suggested in FIG. 2 and seen in FIG. 3. It will be seen that in its initial position, the strip 46 is upwardly convex and straddles the convex crimp 42 of the web 40 of the indentation 36, the longitudinal side edges 48 extending substantially into the longitudinal inner corners 50 formed at the juncture of the web 40 and side portions 38 of the indentation 36, the outer corners opposite the inner corners being designated 52.

When a force is applied downwardly on the strip 46 it straightens out and then becomes overstraightened, as seen in FIG. 4, now to assume an upwardly concave position. In so doing, the longitudinal outer corners 52 of the indentation 36 are forced firmly into the longitudinal corners 34 of the rail groove 28 while the crimp 42 is overstraightened to a slightly concave position and bears against the concave bottom or web 32 of the rail groove. Thus, the joint is continuous and rivetless and is formed without application of lateral pull or tension on the body of the roof sheet thereby preserving its tensile strength. Moreover, if a lateral pull should be applied to the roof sheet in the direction of the arrow 54 shown in FIG. 4, removal of the roof sheet from the rail groove would be effectively resisted because the inner edge 48 of the locking strip 46 would tend to move in an arc as shown by the arrow 56 thereby wedging the inner corner 52 of the roof sheet indentation more tightly into the rail groove corner 34. Furthermore, this lateral pull on the roof sheet could not force the locking strip upwardly from the concave to its previous convex position. The locking strip 46 is also preferably softer than the roof sheet to prevent coining of the roof sheet corners 50 when the strip 46 is overstraightened to the locking position.

Various means may be used to complete the joint at a corner of the trailer body. One such means is shown in FIG. 7. The lateral edge of the roof sheet is also provided with an indentation 58 which is identical with the longitudinal indentation 36 and the upper lateral edges of the body at the front and rear ends of the side walls may also be provided with rail members 60 having upwardly opening grooves 62 identical with the rail grooves 28. Secured upon a corner support post 64 is a corner member or casting 66 whose upper surface is formed with grooves 68 at right angles to each other of the same contour as grooves 28 and 62 of the rail members 14 and 60. When the corner member 66 is properly mounted on the post 64, the grooves 68 thereof align with the rail grooves 28 and 62 to form a continuous path. The corners of the roof sheet are cut away as at 70 between the longitudinal and lateral indentations 36 and 58 and the latter are inserted into the rail grooves 28 and 62 and the intermediate groove 68 of the corner member, there to be secured by an angle bar 72 which is extended into the roof sheet grooves 36 and 58 and anchored in place by fasteners, such as screws 74 that are made to extend through the webs of the roof sheet grooves, the angle bar 72 and the webs of the rail and corner member grooves 28, 62 and 68.

The method of attaching the roof sheet to the side walls is shown diagrammatically in FIGS. 5 and 6. The roof sheet 16, which usually comes in a roll 76, is fed between a lower full width support roller 78 and upper preloaded idler rollers 80 mounted on a shaft 82 to hold the sheet flat. At the ends of the shaft 82, upper rollers 84 are provided whose rolling profiles or peripheries are grooved as at 85, and at the ends of the shaft 86 mounting the roller 78 are further or lower rollers 88 which are wider than the upper rollers. The lower rollers 88 have grooved rolling profiles or peripheries 89 complementary to the profiles 85 of the upper rollers and in which the upper rollers 84 are received. Thus, as the sheet moves along, the upper and lower rollers 84 and 88 cooperate to provide the roof sheet indentations 36 as previously described, adjacent the longitudinal edges of the sheet.

The rails 14 which have been mounted on the side walls 12 of the trailer body are now ready to receive the roof sheet grooves and locking strips. The roof sheet indentations are fed continuously into the rail grooves and the locking strips are similarly fed into the roof sheet indentations. A swaging tool is provided, either manually operated (as by a crank) or motor driven (as with an integral motor or by means of a stationary motor and flexible shaft), which has rollers 90 that ride in and are self-guided by the roof indentations and compress the locking strips 46 and crimps 42 of the roof sheet into the locked positions shown in FIG. 4. The tool also includes serrated drive rollers 92 opposite the swaging rollers 90, which drive rollers engage the lower surface of the web 32 of each rail groove to propel the tool. Since the distance laterally between the roof sheet indentations is predetermined and held by the lateral spacing between the interengaging upper and lower rollers 84 and 88 while the indentations are being formed, and as the width of each indentation is predetermined and held by the rolling profiles of the rollers 84 and 88, when the roof sheet indentations are fed into the rail guides and there locked by the strips 46, the lateral spacing between the top rails 24 and hence the side walls 12 is accurately controlled without the need for temporary roof bows, as is now required with the conventional rivet method of attaching the roof to the side walls.

While a preferred embodiment of the invention has here been shown and described, it will be understood that skilled artisans may make minor variations without departing from the spirit of the invention and the scope of the appended claims.

I claim:

1. In a trailer body having spaced side walls, a longitudinal rail along the top of each side wall, a longitudinal top-opening groove in said rail having transversely spaced side portions joined by a web having a length exceeding the spacing between said side portions and forming longitudinal corners at their junctures, a deformable roof sheet spanning said side walls including top-opening longitudinal grooves spaced conformably to said rail grooves and having transversely spaced side portions joined by a web and forming longitudinal corners at their junctures, each roof sheet groove fitting into each rail groove and means lockingly retaining and securing said roof sheet in said rail grooves, said means including an elongated strip of ductile metal in each roof sheet groove bearing on said web of said roof sheet groove and having longitudinal side edges which bear against said side portions of said roof sheet groove adjacent its longitudinal corners to force the latter firmly against said longitudinal corners of said rail groove whereby the length of said roof sheet groove web exceeds the spacing between the roof sheet groove side portions.

2. The combination of claim 1 wherein said rail groove web is concave and said locking strip is bent convexly towards said rail groove web.

3. The combination of claim 2 wherein said roof sheet groove web is initially provided with a crimp and said locking strip straddles said crimp and is initially curved concavely towards said roof sheet groove web so that when said locking strip is bent towards its convex position it straightens out said crimp.

4. The combination of claim 1 wherein said rail groove corners extend laterally outwardly of the planes of said rail groove side portions, said roof sheet groove corners being forced and retained therein by said locking strip.

5. A method of attaching a deformable roof sheet to spaced side walls of a vehicle comprised of mounting a longitudinal rail on the top of each side wall having a longitudinal groove therein formed of transversely spaced sides joined by a web having a length exceeding the spacing between the sides, forming by continuous rolling longitudinal indentations in the roof sheet having transversely spaced sides joined by a web with a crimp in it and spaced conformably to the rail grooves, inserting the roof sheet indentations vertically into the rail grooves to restrain sidewise motion of the vehicle side walls, inserting a ductile longitudinal strip in each roof sheet indentation and pressing the strip against the web and sides of the roof sheet indentation to straighten the crimp and press the sides of the roof sheet indentation adjacent its web against the corners of the rail groove to lock the roof sheet in the rail groove.

References Cited by the Examiner

UNITED STATES PATENTS

| | | | |
|---|---|---|---|
| 1,940,637 | 12/33 | Stubnitz. | |
| 2,180,504 | 11/39 | Bradfield et al. | 105—42 X |
| 2,627,311 | 2/53 | Kaufmann | 105—395 |
| 2,784,781 | 3/57 | Rhoades | 160—397 X |
| 3,061,364 | 10/62 | Tantlinger et al. | 296—137 |

FOREIGN PATENTS 308,042   3/29   Great Britain.

PHILIP ARNOLD, *Primary Examiner.*

KENNETH H. BETTS, *Examiner.*